(No Model.)

S. H. FARRAR.
MEANS FOR ATTACHING WHEELS, &c., TO SHAFTS.

No. 576,665. Patented Feb. 9, 1897.

Witnesses
H. van Oldenneel
E. A. Scott

Inventor
Sydney Howard Farrar
by Richardson
Attorneys

UNITED STATES PATENT OFFICE.

SIDNEY HOWARD FARRAR, OF JOHANNESBURG, SOUTH AFRICAN REPUBLIC.

MEANS FOR ATTACHING WHEELS, &c., TO SHAFTS.

SPECIFICATION forming part of Letters Patent No. 576,665, dated February 9, 1897.

Application filed May 29, 1896. Serial No. 593,631. (No model.)

*To all whom it may concern:*

Be it known that I, SIDNEY HOWARD FARRAR, residing at Johannesburg, South African Republic, have invented an Improved Device or Means for Attaching Wheels, Pulleys, Cams, Bars, or other Devices to Shafts, of which the following is a specification.

This invention relates to the automatic clamping of wheels, pulleys, cams, bars, or other devices to shafts; and it consists in improved means for that purpose, and in order that the invention may be the better understood it will now be described in relation to the accompanying drawings hereunto annexed, reference being had to the letters marked thereon.

Like letters refer to like parts in the various figures.

Figure 1:
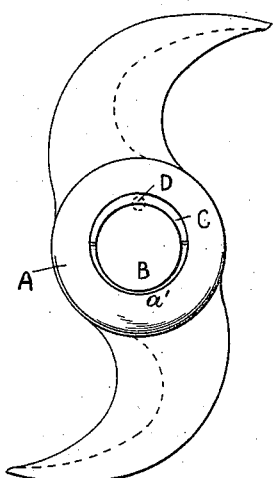
Figure 2:
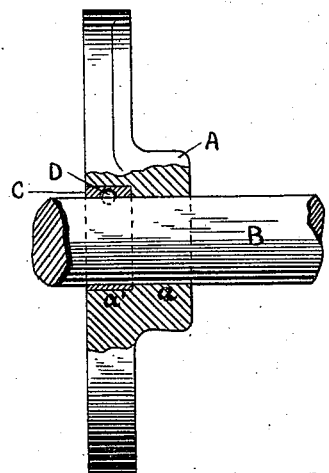
Figure 3:
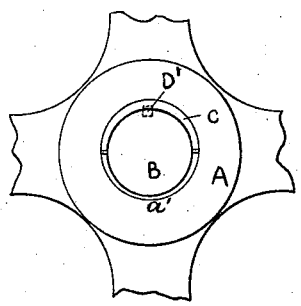

Figure 1 is an end elevation of a cam upon a shaft with the attaching device in place. Fig. 2 is a front sectional elevation of the cam and fastening device, the shaft being shown in full. Fig. 3 is an end elevation of a boss of a wheel or pulley upon a shaft with a modified fastening device.

To carry the invention into effect, the boss A of the pulley, wheel, cam, or bar which it may be desired to firmly secure or clamp to a round shaft B is bored with a hole of which one part, $a$, is concentric to the boss A of the pulley, wheel, cam, or bar, and an approximate fit to the shaft B, and the other part, $a'$, is slightly eccentric to the shaft B or to the aforesaid concentric bore $a$ and is of larger diameter. Within this eccentric bore $a'$ is placed an eccentric bush or sleeve C, split or divided into sections in any convenient manner. The said eccentric bush C is prevented from revolving around the shaft B by a ball D, sunk partly into the under face of the eccentric bush C and partly into a corresponding recess in the shaft B, as shown in Figs. 1 and 2, or a pin $D'$ may be employed, engaging the shaft B and bush C, as shown in Fig. 3, or, equivalently, the pin $D'$ may be inserted into the surface of the shaft B and adapted to engage the bush C between the ends of its sections.

The pulley, wheel, cam, or bar being placed upon the shaft B, it is slid along over the eccentric bush C, which has previously been placed in position on the shaft B so as to engage the bush C in the eccentric bore $a'$. When, now, the pulley, wheel, cam, or bar is turned in either direction, the eccentric and concentric bores will jam upon the bush and shaft relatively, and the pulley, wheel, cam, or bar will be firmly fixed in position for driving so long as the driving resistance tends to jam the pulley, wheel, cam, or bar farther home. By knocking back the pulley, wheel, cam, or bar into the original position in which it was placed on the shaft it will be again loose and may be shifted on the shaft as desired. By this arrangement the wheel, pulley, cam, or bar will jam if turned either way on opposite sides of the normal position of freedom.

Having now described my invention, what I claim, and desire to secure by Letters Patent, is—

1. In combination, the shaft, a pulley having a bore to receive the same and having also an eccentric bore of larger diameter than the shaft, said eccentric bore opening laterally of the pulley and of its full diameter, the eccentric bush in said open bore and the ball between the bush and shaft for holding the bush against movement about the shaft or longitudinally thereof.

2. In combination, the shaft, a pulley having a bore to receive the same and having also an eccentric bore of larger diameter than the shaft, said eccentric bore opening laterally of the pulley and of its full diameter, the eccentric bush in said open bore, and locking means between the bush and the shaft for holding the bush against movement about the shaft, said locking means projecting from one part into a recess in the other part, the said pulley being thus adapted to be pushed longitudinally of the shaft over the locking device.

In testimony whereof I have signed my name to this specification in the presence of two subscribing witnesses.

SIDNEY HOWARD FARRAR.

Witnesses:
ABRAHAM SHEARD,
JAMES MUIR.